Oct. 23, 1923.

F. J. CURTIS 1,471,686

TIRE CUTTING IMPLEMENT

Filed May 13, 1921

2 Sheets-Sheet 2

Inventor
Francis J. Curtis

By Donald U. Rich.

Attorney

Patented Oct. 23, 1923.

1,471,686

UNITED STATES PATENT OFFICE.

FRANCIS J. CURTIS, OF SHARON, PENNSYLVANIA.

TIRE-CUTTING IMPLEMENT.

Application filed May 13, 1921. Serial No. 469,219.

*To all whom it may concern:*

Be it known that I, FRANCIS J. CURTIS, citizen of the United States, residing at Sharon, in the county of Mercer and State of Pennsylvania, have invented certain new and useful Improvements in Tire-Cutting Implements, of which the following is a specification.

This invention relates to tire cutting implements, and refers more particularly to an apparatus for cutting the tire to remove the tread or the beads or any intermediate portion thereof, or to remove merely the rubber from the fabric of the tire.

This invention comprehends, primarily, the combination of a supporting means, or chuck, for the tire and a rotary cutting element, the latter being adapted to cut entirely through the tire or to strip the rubber from the fabric of the tire.

It is well known that after a tire has been used for considerable time, either the tread wears away, or the beads become useless due to tears, etc. It is therefore, one object of this invention to provide a device which will easily and neatly, remove the beads from a tire, and then remove the tread from a tire, and then the serviceable portions of the two tires are ready to be joined in making a practically new and serviceable tire, thus eliminating expense which would otherwise be sustained in purchasing an entirely new tire.

A still further object of this invention, is to provide a device of the above mentioned character, which is easy and inexpensive to manufacture, and strong and durable in operation.

Other objects and advantages of this invention will be apparent to those skilled in the art, and the particular features of novelty will be pointed out in the appended claims. I desire it understood, however, that various changes in the form and proportions of the device may be made, within the scope of the appended claims, without departing from the spirit of the invention.

Figure 1:
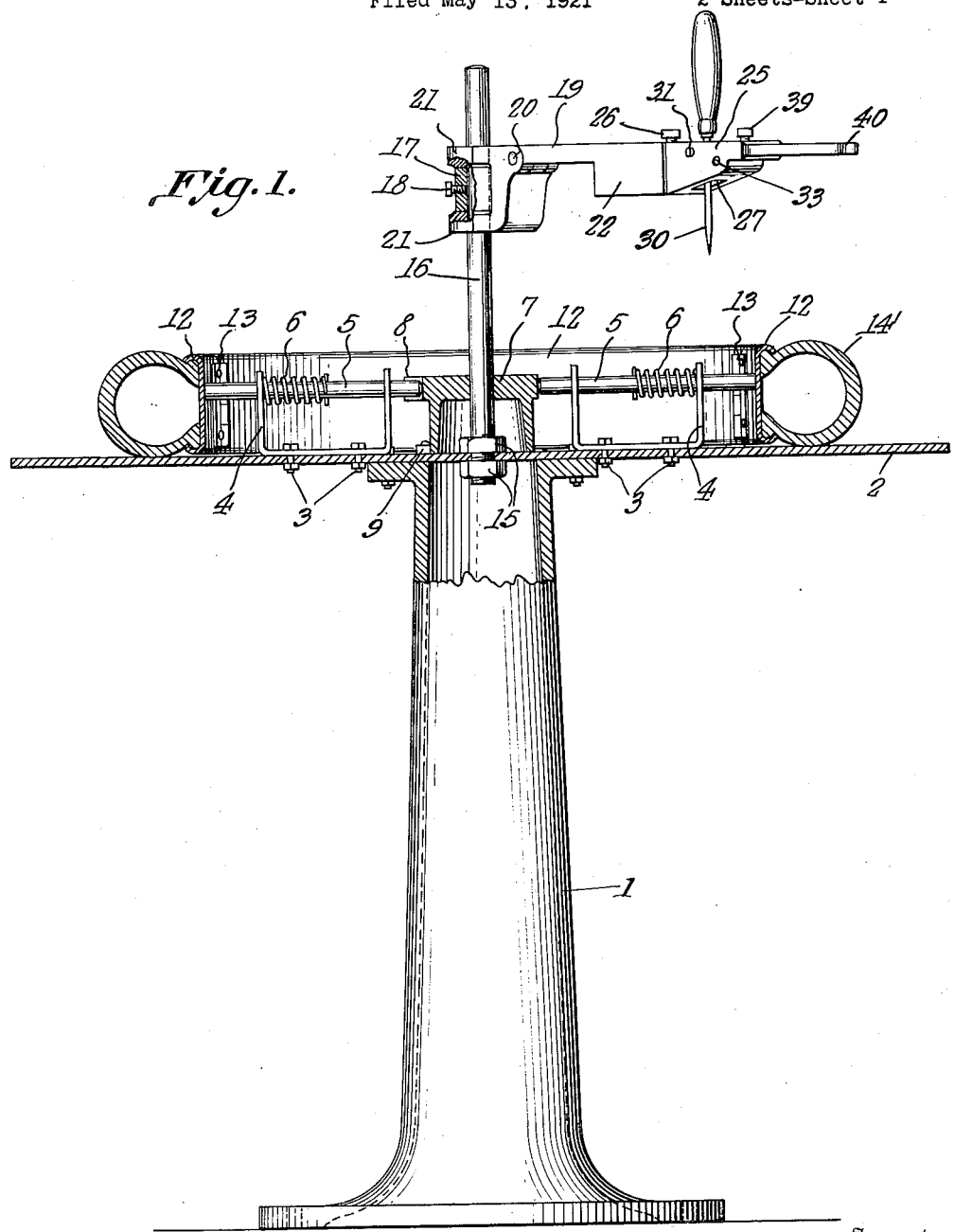
Figure 2:
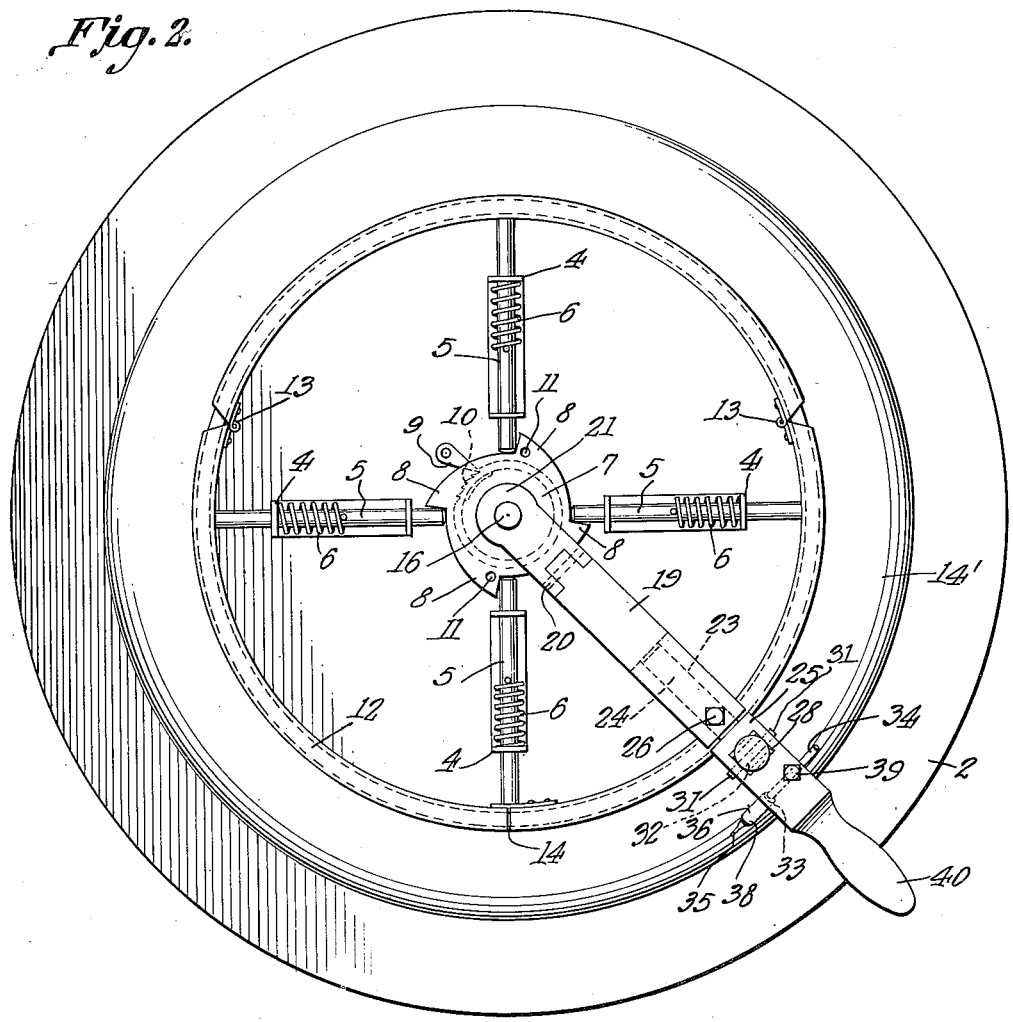
Figure 3:
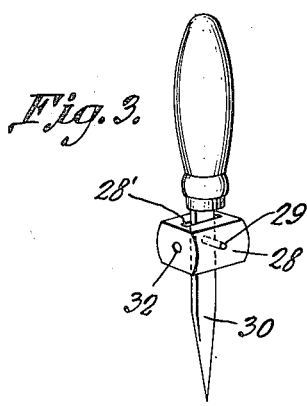
Figure 4:
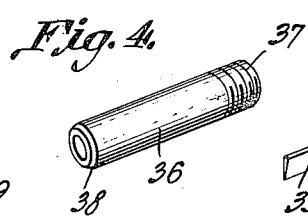
Figure 5:
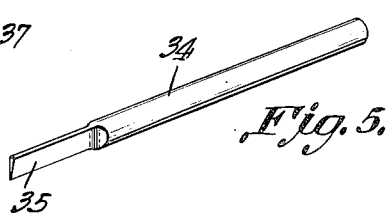

In the drawings forming a part of this specification, and wherein similar characters of reference designate similar parts in the several views, Figure 1, is an elevation, partly in section of the entire device, Fig. 2, is a top plan view of the device, Fig. 3, is an elevation of the awl used with the device, Fig. 4, is a perspective view of the knife used with the device, and Fig. 5, is a perspective view of the depth gauge used with the knife.

Referring now, more particularly to the drawings, the device comprises a base or standard 1, preferably tubular in form, on which is mounted a table 2, all of which are of suitable material, preferably cast metal.

Secured to the table 2, at diametrically opposite points, by means of bolts 3, are U-shaped brackets 4, which are, in reality, supports for plungers 5 which are slidably mounted therein and provided with a coil spring 6 for an obvious purpose.

Secured to the table 2, at substantially the center thereof is an upstanding cam element 7, provided with a plurality of cam surfaces 8 which are adapted to be engaged by the rear ends of plungers 5, as shown in Figure 2.

Secured to the table 2, in close proximity to the cam element 7 is a pivoted pawl 9 which engages ratchet teeth 10, formed on the base of said cam element 7. The pawl 9, it is obvious, may be spring pressed if desired, but for practical purposes it has been found perfectly operative without a spring. The upper face of cam element 7 is provided with oppositely arranged apertures 11 for receiving a suitable tool, such as a spanner wrench, for rotating the cam element 7.

For supporting a tire casing upon the table 2, a rim 12 is provided which is hinged at 13 and split at 14, forming thereby, a three piece rim, the tire casing thereon, being designated by the numeral 14'.

Secured to the table 2, at substantially the center thereof by means of nuts 15, and extending vertically through the cam element 7 is a pivot post 16, to which is secured the cutting implements and their necessary adjuncts, which will now be described.

As more clearly shown in Figure 2, the post 16 has slidably mounted thereon a removable collar 17 having a binding screw 18 passed therethrough for retaining said collar in any desired position on the post.

Extending at substantially right angles to the post 16, and parallel to the table 2 is an arm 19, hinged at 20, and provided with rearwardly extending apertured flanges 21 which are adapted to slide on said pivot post; the collar 17 being received between said flanges and serving as a support for the arm 19, as will be obvious.

The forward end of arm 19 is provided with an enlarged portion 22 which is bored out, as shown at 23 to receive the reduced end 24 of a tool support 25. An adjusting screw 26 is provided which extends through the enlarged portion 22 and bind against the reduced end 24 for retaining the same in any desired position with respect to the length thereof.

The tool support 25 is provided with a vertically arranged aperture 27, which may be tapered if desired; said aperture receiving an awl supporting block 28 in which is mounted on a pivot 29, an awl 30. As shown in detail in Figure 3, the awl supporting block 28 is provided with a central aperture 28′ for permitting the pivotal movement of awl 30 with respect to said block 28.

The block 28 is pivotally mounted within the opening 27 by means of pivots 31, extending through the tool support 25 into openings 32 in the awl support 28.

The tool support 25 is further provided with a threaded opening 33, angularly disposed with relation to the tool support 25, and which receives a knife 34, having a cutting blade 35.

A gauge 36 is provided for the knife 34 in order to prevent an operator of the device from cutting too deep into the tire casing, and comprises a tubular sleeve having one end thereof externally threaded as shown at 37, which end is received and adjustable within the above mentioned threaded opening 33. The forward end of the gauge 36 is tapered as shown at 38 to provide a surface which rests upon the casing when the knife is in use.

In use, the gauge is placed within the threaded opening 33 and adjusted therein, and the knife is inserted through the opening 33 and the gauge 36, and said knife is retained in the desired position with respect to the gauge and the tire casing by means of a set screw 39 which extends through the tool support and bears against the handle of the knife.

For convenience in operating the device herein described, a handle 40 is provided which is preferably integral with the tool support 25.

The operation of the device is comparatively simple, and but little description thereof is necessary.

When it is desired to remove the bead from a tire casing, the tire casing is placed upon the rim 12 and the rim then placed upon the table 2. The rim is then tightly held in place by rotating the cam element 7 thus forcing the plungers 5 against the interior of the rim.

In cutting the entire bead from the casing the awl can be dispensed with either by removing the block and awl from the aperture 27, or merely removing the awl from the block 28. The arm 19 is then adjusted to the desired position on the post 16.

The tool support 25 is then adjusted to the desired position, and the knife 34 also adjusted to the desired position and the handle grasped and the tool support and arm 19 rotated. The knife will thereupon cut through the bead of the casing and remove same in a clean and symmetrical manner.

If it is desired to remove only the rubber from the fabric, the arm 19 and tool support are adjusted as above mentioned and the knife is adjusted to cut only through the rubber. The awl is then inserted, and due to its pivotal mounting, it may be manipulated back and forth, thus gradually stripping the rubber from the fabric.

It is believed that the operation, as briefly described above, will be readily understood by those skilled in the art to which it appertains.

Having thus described my invention, what I claim as new and desire to secure by Letters Patent of the United States is:

1. Means for stripping rubber from the fabric of a tire, comprising, tire holding means, a tool support above said tire holding means, a cutting element adjustable in said tool support, and a rubber stripping element adjustable in said tool support.

2. Means for stripping rubber from the fabric of a tire, comprising, tire holding means, a vertically and horizontally adjustable tool support adjacent to said tire holding means, a multiple tool holder adjustably secured to said tool support, and a pivotally mounted rubber stripping element carried by said tool support.

3. Means for cutting and stripping the rubber from a tire casing, comprising, tire retaining means, and adjustable, rotary, hinged, tool support mounted above said tire retaining means, and means on said tool support for cutting and stripping the rubber from the fabric of the tire casing.

4. A device of the class described, comprising, tire retaining means, cam actuated mechanism for rigidly holding said tire retaining means, a rotary, hinged, adjustable tool support mounted above said tire retaining means, and a cutting element adjustably mounted in said tool support and angularly disposed with relation thereto.

5. An apparatus of the class described, comprising, a tire retaining means, means for rigidly holding said tire retaining means, a tool support rotatably mounted above said tire retaining means, and means on said tool support for cutting and stripping the rubber from the fabric of a tire casing.

6. An apparatus for cutting portions of a tire casing comprising, tire retaining means, a tool support adjustably and rotatably mounted above said tire retaining means, a cutting element angularly and adjustably mounted in said tool support, and a depth gauge cooperating with said cutting element.

7. An apparatus for cutting portions from a tire, comprising tire retaining means, and an adjustable cutting element mounted adjacent said tire retaining means and capable of rotary motion.

In testimony whereof I hereby affix my signature.

FRANCIS J. CURTIS.